Patented June 3, 1947

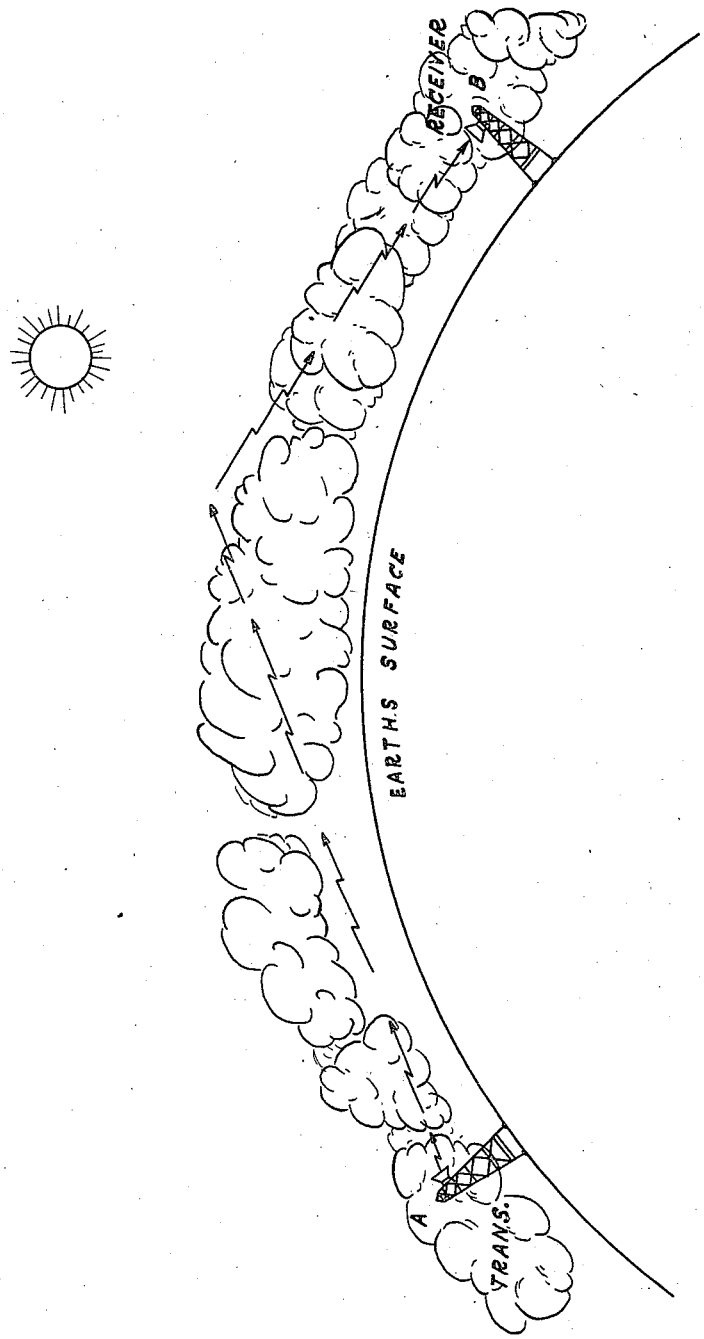

2,421,730

UNITED STATES PATENT OFFICE 2,421,730

WEATHER PREDICTION WITH ULTRA HIGH FREQUENCY RADIO WAVES

Gilbert S. Wickizer, Riverhead, N. Y., assignor to Radio Corporation of America, a corporation of Delaware Application March 20, 1944, Serial No. 527,165

1 Claim. (Cl. 73—170)

This invention relates to the prediction of weather conditions from the propagation characteristics of ultra high frequency radio waves below one meter. Since radio waves of such frequencies are propagated beyond the horizon mainly by refraction, a change in the refractive index of the lower atmosphere will cause a change in signal field strength. The interpretation of the changes in the refractive index in terms of air mass characteristics thus permits a qualified observer to obtain a qualitative picture of the vertical structure of the lower atmosphere. Taken in combination with surface observations, such as prevailing atmospheric pressure, temperature, relative humidity, and wind direction and velocity, the information derived from radio propagation at ultra high frequencies is of value in predicting weather conditions.

A qualitative estimate of the air mass characteristics in the transmission path is made from an interpretation of the signal field strength beyond the horizon. The electrical characteristic of the air which directly affects refraction is its dielectric constant. The gradient of the dielectric constant above the surface of the earth determines the amount of refraction. Refraction of the signal beyond the horizon requires a smaller value of dielectric constant at the higher altitude, i. e., a negative gradient of dielectric constant with respect to height, so the velocity of propagation is higher at the higher altitude, thus bending the signal path back toward the surface of the earth. The dielectric constant of the air may be calculated from the atmospheric pressure, the temperature, and the relative humidity. The separate steps are as follows: (1) Field strength variations indicated by a receiving instrument located beyond the horizon with respect to the transmitter indicate the relative vertical distribution of the dielectric constant of the air near the earth's surface. (2) From a knowledge of the vertical distribution of the dielectric constant of the air, a qualitative estimate of the air mass characteristics may be made, and (3) knowing the air mass characteristics, an estimate of coming weather conditions may be made in combination with surface weather conditions.

It should be distinctly understood that the prediction of weather conditions in accordance with the present invention is primarily concerned with the propagation characteristics of the ultra high frequency radio waves through the air near the earth's surface. More specifically, the present invention is concerned with the propagation characteristics of the signal through troposphere where there are cloud and weather variations, and not with the propagation characteristics through higher altitudes.

By way of further exposition, it should be understood that for qualitative work, above 32° F., the absolute humidity (mass of water vapor per unit volume of air) is a measure of the dielectric constant of the air. Practical conditions to produce a steep negative gradient of dielectric constant near the surface of the earth may occur in several ways. For example, the diurnal heating and cooling of relatively dry air will result in a steep negative gradient of dielectric constant at night, due to radiation at the surface of the earth. This radiation from the earth's surface at night cools the lower layer of the atmosphere, with resulting increase in relative humidity and dielectric constant. This is the normal condition at night in clear, calm weather. A steep negative gradient of the dielectric constant during the day is not normal due to turbulence. This turbulence may be due to the rising of warm air due to heating of the earth's surface by the rays of the sun. However, during rainy weather, the absolute humidity near the earth's surface is high and the arrival of clearing weather in the daytime due to the sun heating the air at higher altitudes first, results in a steep negative gradient of dielectric constant and a strong radio signal at the receiver. This occurs a matter of hours before clearing weather reaches the surface of the earth and is the first sign of approaching good weather.

The present invention provides a means by which it is possible to determine the arrival of clearing weather in the daytime when weather conditions near the earth's surface are characterized by stratus clouds with or without precipitation. This is accomplished by means of an ultra high frequency transmitter generating oscillations of a frequency higher than the order of 300 megacycles and preferably higher than 600 megacycles and a receiver for the transmitted frequency located beyond the optical horizon relative to the transmitter. The distance between the transmitter and the receiver should be such that weather conditions affect the signal path between the two stations. The receiver output is recorded, preferably by a moving-pen type of recorder in order to provide a continuous record of signal strength. It is preferred that the transmitter be situated on top of a mast or of a tall building so as to be located as high as possible above the earth's surface. While this is desirable, in order to obtain as long a range of distances possible between the transmitter and the receiver, it is not essential. For that matter, the transmitter may be located on a mountain peak.

A more detailed description of the invention follows in conjunction with a drawing whose single figure illustrates, by way of example, one method by which weather conditions may be predicted in accordance with the invention.

Referring to the drawing, there is shown a transmitter at station A, preferably located at a considerable height above the earth's surface, and a receiver at station B located beyond the optical horizon from station A. Both the transmitter and the receiver are provided with highly directive antennas pointed toward one another. These antennas may have any suitable directive structure, such as a radiator located in front of a parabolic reflector or an electromagnetic horn. An inspection of the drawing will show that it is impossible for a straight line to be drawn between the transmitter A and receiver B without intercepting the earth's surface. The radio waves transmitted by the transmitter A are of ultra high frequency characteristic, preferably of a frequency higher than 600 megacycles. The receiver is provided with apparatus for making a continuous record of the signal strength, for example a moving pen type of recorder having a continuously advancing sheet of paper upon which the signal strength or receiver output is recorded.

The shaded lines in the space between the transmitter and the receiver indicate heavy clouds, thus representing a region of high humidity located in the transmission path between the transmitter and the receiver. Although the clouds are not shown touching the earth's surface, it will be evident that there is a condition of high humidity at the earth's surface in this region. The space immediately above the clouds is shown clear, thus representing a region of relatively low humidity compared to the condition immediately adjacent the earth's surface. This region of relatively low humidity immediately above the clouds may be caused by the rays of the sun heating the air above the clouds. With such a condition, the ultra high frequency signal transmitted by the station A will penetrate the clouds and then be refracted over the horizon to be received by the receiver at B. When the attendant at the receiver B receives the signal from station A of an increased intensity, he will know that the weather will soon clear. These assumptions have of course been made for daytime conditions.

In one embodiment of the invention actually tried out in practice, the transmitter generated radio signals having a frequency of the order of 2800 megacycles. The transmitter employed an electromagnetic horn located 1250 feet above the earth's surface, at the top of the Empire State Building in New York, New York. The receiver also employed an electromagnetic horn and was located at Riverhead, Long Island, a distance of approximately seventy miles from the transmitter. The receiver was beyond the optical horizon with respect to the transmitter. With a set-up of the type hereinabove described, it was possible to predict in the daytime an improvement in the weather within a very short time after the signals were received at the receiver after passing through a region of high humidity. It was found that a large increase in the amplitude of the signal at the receiver, under the conditions set forth above, indicated that improvement in the weather would occur within a short space of time. Stated in other words, although the receiver might be receiving relatively weak signals from the transmitter in the presence of a region of high humidity between the transmitter and the receiver, the intensity of these signals would increase considerably when there is a region of relatively low humidity above the clouds such as might be caused by clear weather or the sun shining down upon the clouds.

The foregoing method of predicting weather conditions has been found to hold true in the daytime. At night, however, due to other factors, such as cooling of the earth's surface, it was not found possible to employ the invention for predicting an improvement in the weather. This may be due to the fact that the sun is not present at night to heat the air above the earth's surface.

While the present invention has utilized a pair of land stations to predict an improvement in the weather, it is possible that entirely different conditions may prevail if one of these stations is located at sea.

One advantage in employing the system of the present invention for determining an improvement in the weather lies in the fact that observations are made at only one point; to wit, the receiver, and these observations are independent of other sources of weather information. In practice, it may be advisable to have a single transmitter station located centrally with respect to a plurality of receiving stations positioned beyond the optical horizon and arranged in a circle around the transmitter. With such an arrangement, it will be possible to determine when there would be an improvement in the weather at any one of a plurality of spaced points located at a distance from a central transmitting station.

What is claimed is:

The method of predicting an improvement in the weather between a pair of spaced points located beyond the optical horizon from each other and between which there is a region of high humidity adjacent the earth, which comprises directively transmitting from one of said points toward the other a sharp beam of radio waves having a frequency higher than the order of 300 megacycles, making continuous observations of the intensity of the receiving signals, and determining from a sudden increase in the intensity of the signals at the receiving point that there will be an improvement in the weather within a short space of time after the receipt of said signals of increased intensity.

GILBERT S. WICKIZER.

REFERENCES CITED

The following references are of record in the file of this patent:

UNITED STATES PATENTS

| Number | Name | Date |
|---|---|---|
| 2,165,214 | Blau et al. | July 11, 1939 |
| 2,191,277 | George | Feb. 20, 1940 |
| 1,809,967 | Forbes | June 16, 1931 |

OTHER REFERENCES

Technical Publication entitled "Experiments on the Propagation of Ultra-Short Radio Waves," by A. H. Waynick, in Proceedings of the I. R. E., vol. 28, No. 10, October 1940. (Copy of Reprint (19 pages) in Division 51, U. S. Patent Office 250—1.2.)

Technical Publication entitled "Measurement of Broadcast Coverage and Antenna Performance," by William A. Fitch and William S. Duttera, in R. C. A. Review, April 1938. (Copy of Reprint (18 pages) in Division 51, U. S. Patent Office 250—1.2.)